United States Patent [19]
Fujiwara

[11] Patent Number: 6,032,336
[45] Date of Patent: Mar. 7, 2000

[54] TOP ROLLER FOR A DRAFT APPARATUS

[75] Inventor: Michiaki Fujiwara, Kameoka, Japan

[73] Assignee: Murata Kikai Kabushiki Kaisha, Kyoto, Japan

[21] Appl. No.: 09/246,159

[22] Filed: Feb. 8, 1999

[30] Foreign Application Priority Data

Mar. 5, 1998 [JP] Japan ..................................... 10-53133

[51] Int. Cl.[7] .................................................. D01H 5/74
[52] U.S. Cl. .............................. 19/258; 19/236; 384/517; 384/518
[58] Field of Search ........................... 29/898.07, 898.09, 29/898.062, 898.064; 492/16, 38, 39, 42, 47; 384/517, 518, 563; 19/258, 236

[56] References Cited

U.S. PATENT DOCUMENTS

| | | | |
|---|---|---|---|
| 4,116,506 | 9/1978 | Moritomo et al. | 384/518 |
| 4,476,614 | 10/1984 | Pittroff | 29/898.09 |
| 4,541,742 | 9/1985 | Lederman | 384/518 |
| 4,852,230 | 8/1989 | Yu | 29/898.07 |
| 5,308,172 | 5/1994 | Upadhya et al. | 384/518 |

OTHER PUBLICATIONS

Japanese Abstract of IPC F16C25/08.
Japanese Abstract of 62–159809.

Primary Examiner—John J. Calvert
Assistant Examiner—Gary L. Welch
Attorney, Agent, or Firm—Armstrong, Westerman, Hattori, McLeland and Naughton

[57] ABSTRACT

When a roller cylinder of a top roller is installed, it may collide against an outer bearing and damage it. Since the roller cylinder is loosened, when drafting is executed at a high speed, the roller cylinder may vibrate, causing non-uniform drafting. A pre-loading spring 30 is installed between an inner bearing 20 and an outer bearing 21 and on the inner circumferential side. Due to the elastic force of the pressurizing spring 30, inner rings 20b and 21b of the bearings rotate integrally with a shaft 10. When the roller cylinder 12 is installed, if it collides against the outer bearing 21, the pre-loading spring 30 acts as a buffer to prevent damage to the bearings. O-rings 31 and 32 installed between outer rings 20a and 21a of the bearings 20 and 21 fill the gap to prevent the roller cylinder 12 from loosening. As a result, uniform drafting can be executed at a high speed.

5 Claims, 4 Drawing Sheets

TOP ROLLER FOR A DRAFT APPARATUS

FIELD OF THE INVENTION

The present invention relates to a draft apparatus used to draw a sliver, and, in particular, to a top roller that is included in the draft rollers for holding the sliver and applying a drawing force to it.

BACKGROUND OF THE INVENTION

A drawing step is executed to-draw a fiber bundle, called a "sliver" in order to adjust to a predetermined thickness of fibers, which are used as a yarn material. FIG. 3 shows the main part of a draft apparatus D for drawing a sliver S. The draft apparatus D comprises multiple draft rollers, including a front roller 1, an apron roller 2, a middle roller 3 and a back roller 4, arranged in this order from downstream to upstream. The rollers are each composed of a vertically spaced pair includes a top roller t that rotates freely and a bottom roller b that is rotationally driven. The sliver S is sandwiched between the top roller t and the bottom roller b, and the roller speed is set in such a way as to sequentially increase from the input side to the output side, thereby enabling the sliver to be drawn.

Each top roller t for drafting conventionally has a structure such as that shown in FIG. 4. Two bearings 20 and 21 are installed via a spacer 14 on a shaft core 10a formed at both ends of a shaft 10, and a roller cylinder 12 is externally installed on the bearings 20 and 21. The spacer 14 is composed of an outer circumferential spacer 14a and an inner circumferential spacer 14b that can rotate relative to each other, and a C-ring 13 fitted in the outer circumferential spacer 14a is used to position the spacer 14a relative to the roller cylinder 12. The roller cylinder 12 has on the surface of the cylinder body 12a a top cot layer 12b for holding the sliver S. The top cot layer 12b is formed of rubber etc. By fixing a washer 16 to the end surface of the shaft core 10a using a bolt 15, an axial pressure is applied to inner rings 20b and 21b of the bearings 20 and 21 and the inner circumferential spacer 14b to press these components against a pressure-receiving section 10b formed around the base of the shaft core 10a in order to allow the shaft 10 to rotate integrally with the inner rings 20b and 21b of the bearings 20 and 21. An O-ring 11 is mounted on the shaft 10 to prevent the entry of waste fibers etc. In addition, a cap 17 is installed on the end surface of the top roller t.

In the conventional top roller t configured as described above, the bearings 20 and 21 and the inner circumferential spacer 14b are fixed to the shaft 10 in such a way as to form almost no gap. Thus, when the roller cylinder 12 is externally installed on the bearings 20 and 21 and if the shaft 10 and the roller cylinder 12 are decentered relative to each other, the roller cylinder 12 may collide against the outer bearing 21 to effect a large impact force, thereby damaging the outer bearing 21.

In addition, since the outer circumferential spacer 14a generally has a slightly shorter axial length than the inner circumferential spacer 14b, a small gap is formed between the outer rings 20a and 21a of the bearings 20 and 21 and the outer circumferential spacer 14a. Consequently, the roller cylinder 12 may be loosened. When drafting is executed at a high speed to increase the number of rotations of the top roller, the roller cylinder 12 may vibrate, causing non-uniform drafting.

SUMMARY OF THE INVENTION

The present invention is a top roller for a draft apparatus for drawing a sliver, which is designed to solve this problem and characterized in that the top roller comprises a roller cylinder rotatably installed on a shaft via bearings and in that an elastic member is used to press inner rings of the bearings against a pressure-receiving section formed in the shaft.

The elastic member may be a spring.

This invention also provides a top roller for a draft apparatus for drawing a sliver characterized in that the inner ring of one of the bearings is engaged with the pressure-receiving section formed at an end of a shaft and in that the spring is installed between the inner rings of the bearings so as to press the set of bearings oppositely along the bearing surface of the shaft with the spring installed thereon.

Furthermore, an axial pressure may be applied to an outer ring of the bearing to prevent it from loosening.

An O-ring may be used to apply the above pressure.

DETAILED DESCRIPTION OF THE PREFERRED EMBODIMENTS

Figure 1:
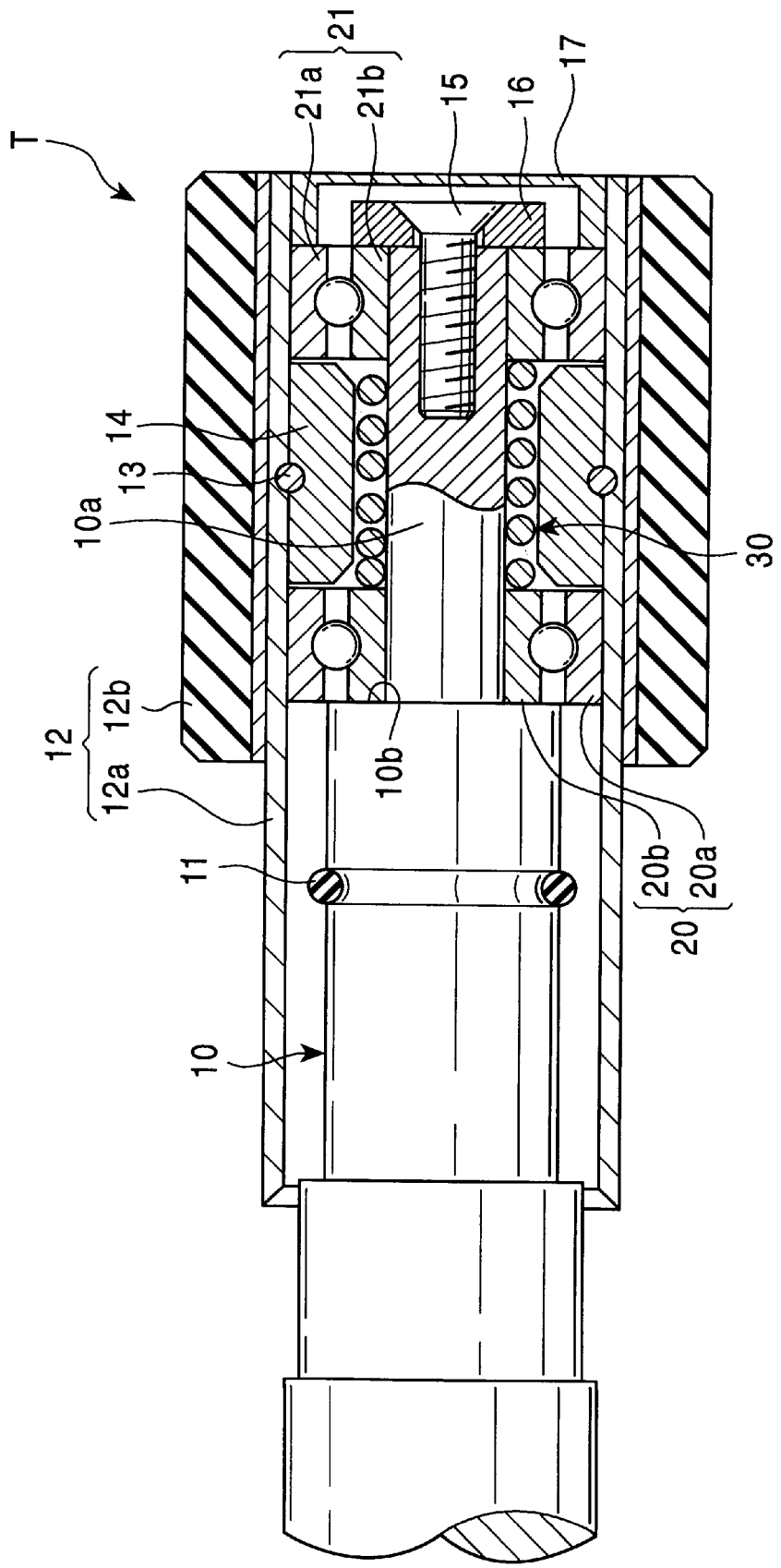
FIG. 1 is a sectional view of the integral part of a first embodiment of a top roller according to this invention.

FIG. 1 shows an example of a top roller T. This top roller T differs from the conventional ones in that a spacer 14 comprising only a conventional outer circumferential spacer which provides a small axial gap between the bearings is installed between an inner bearing 20 and an outer bearing 21 while a pre-loading spring 30 is installed on the inner circumferential side of the spacer about the shaft core 10a.

In the top roller T configured as described above, the pre-loading spring 30 applies an elastic force to press an inner ring 20b of the bearing 20 against a pressure receiving section 10b of the shaft 10 while pressing an inner ring 21b of the bearing 21 against a washer 16 secured to the shaft core via bolt 15. Thus, the inner rings 20b and 21b of the bearings 20 and 21 can rotate integrally with the shaft 10.

Since the pre-loading spring 30 is installed between the bearings 20 and 21, the top roller T can be assembled and disassembled easily, enabling the bearings to be simply replaced. Besides, when the roller cylinder 12 is installed, if it collides against the outer bearing 21, the pre-loading spring 30 acts as a buffer to prevent damage to the bearings.

Figure 2:
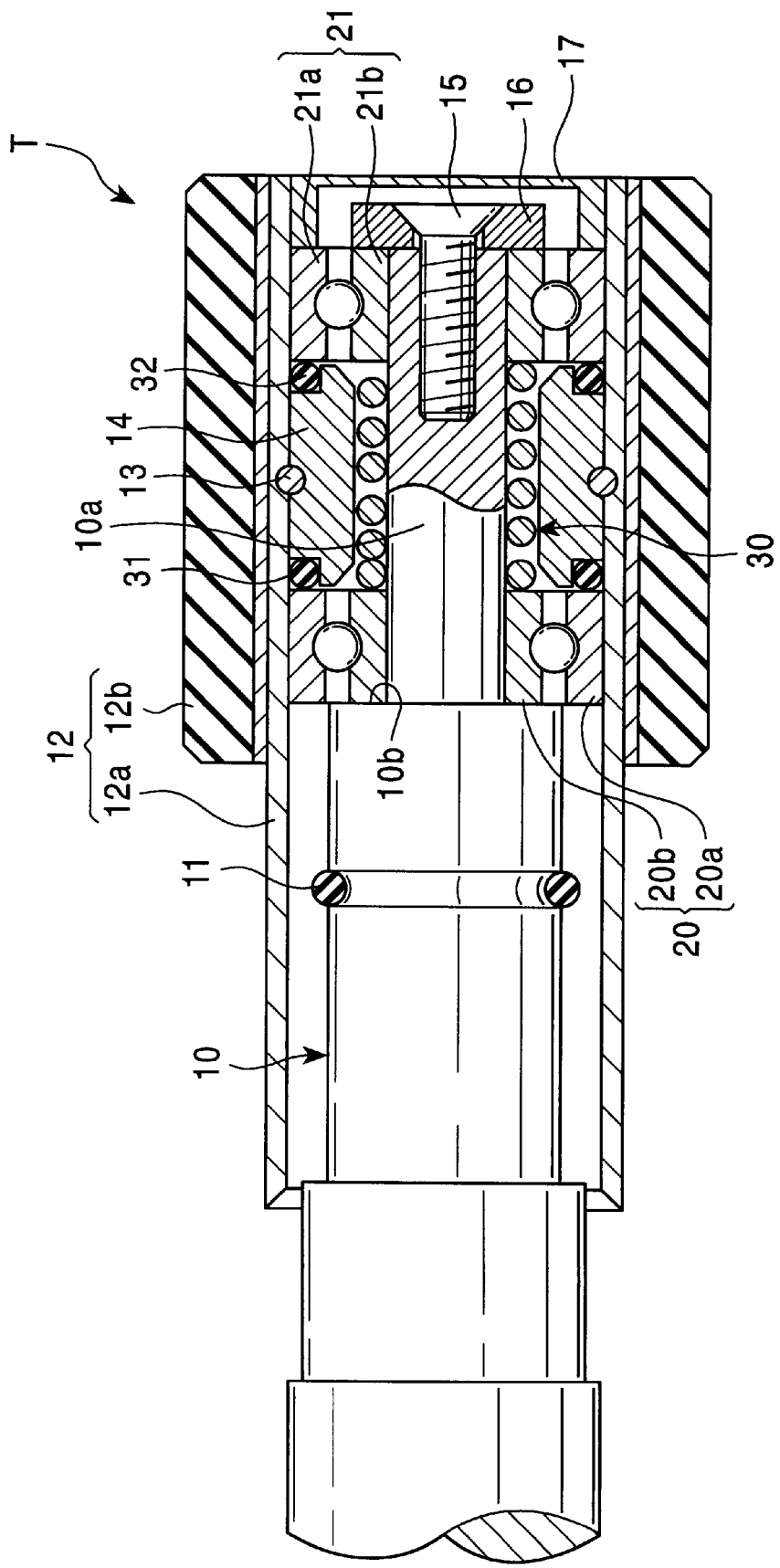
FIG. 2 is a sectional view of the integral part of a second embodiment of a top roller according to this invention.
Figure 3:
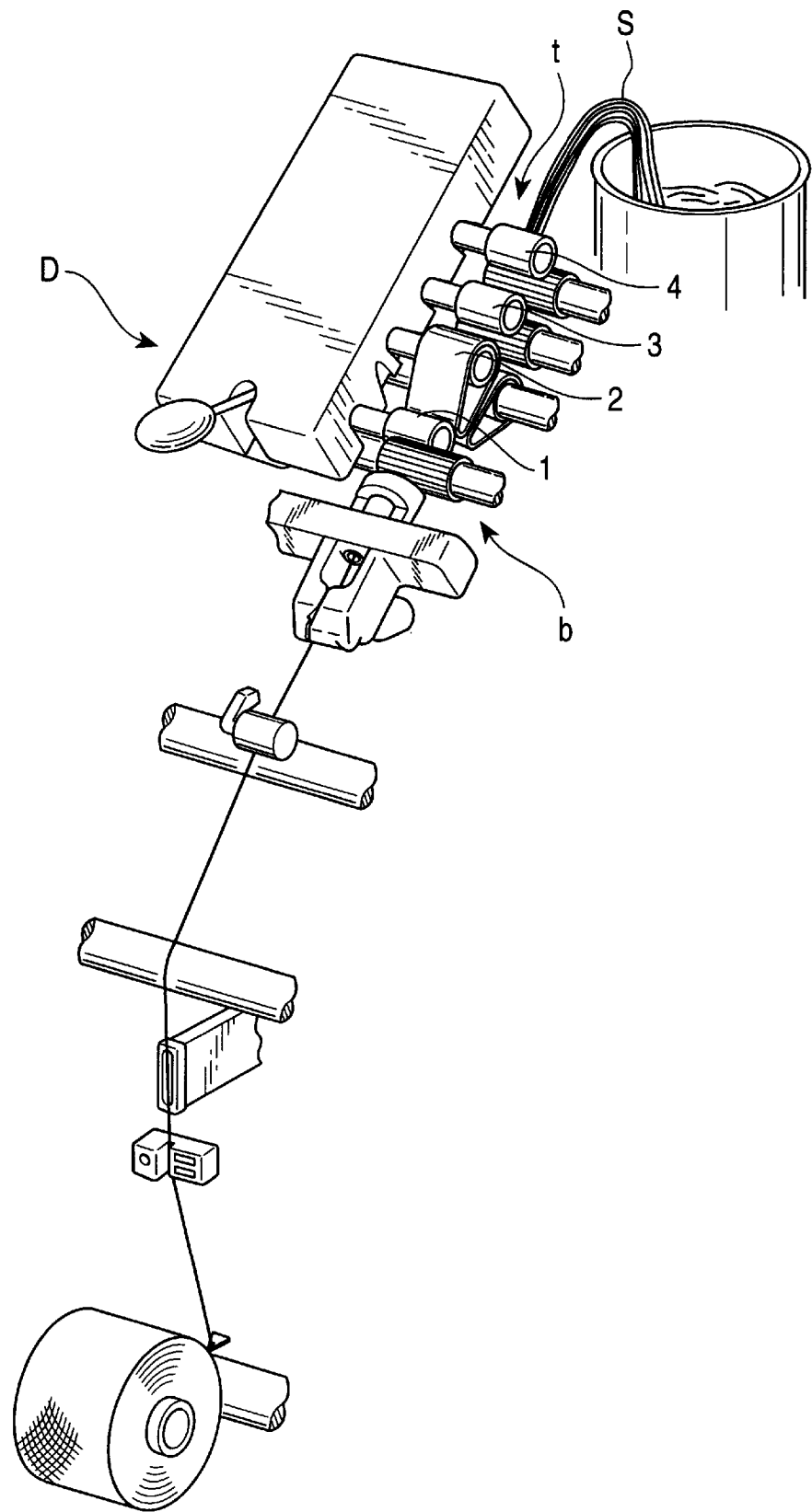
FIG. 3 is a perspective view of the integral part of an example of a draft apparatus.
Figure 4:
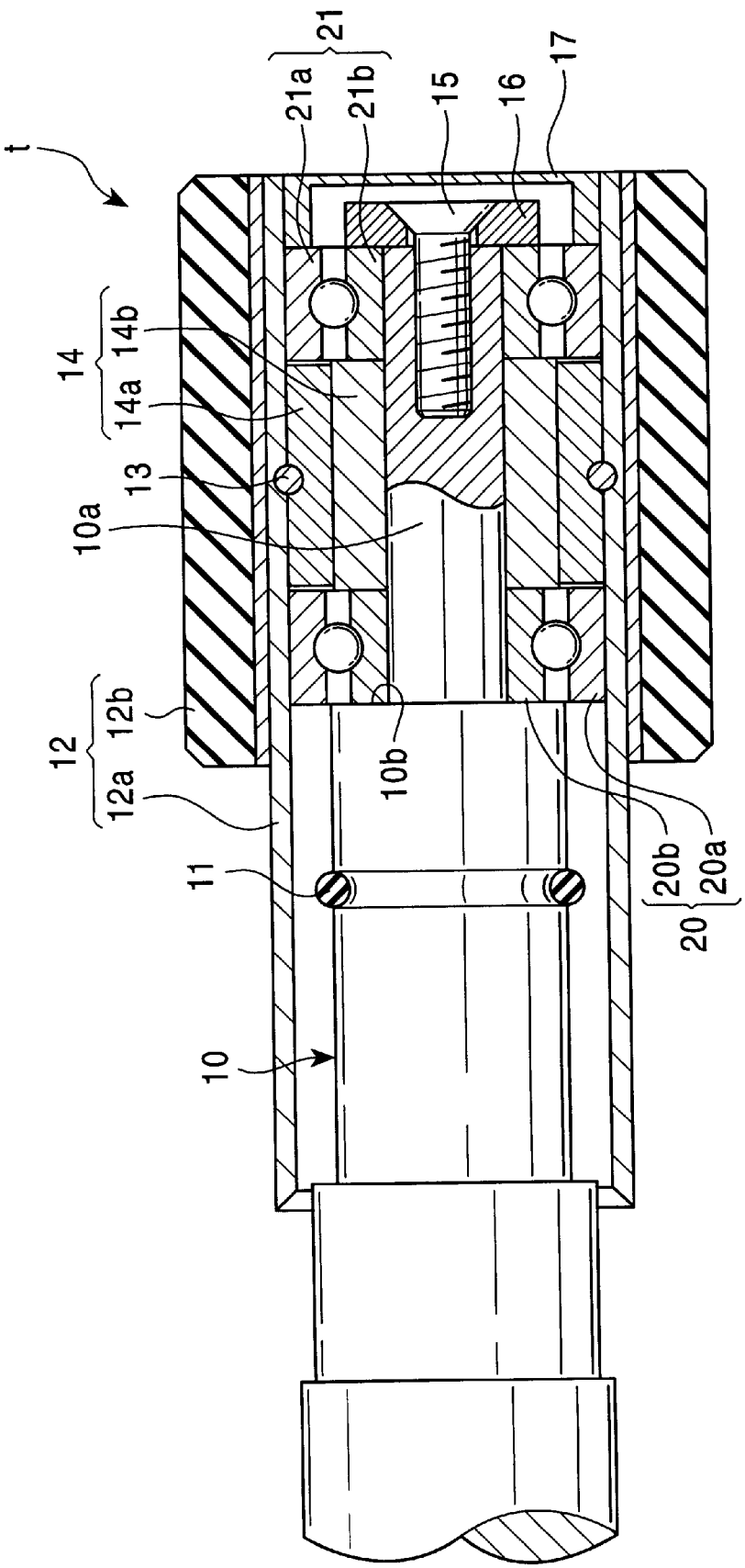
FIG. 4 is a sectional view of the integral part of a conventional top roller.

In addition to the first embodiment shown in FIG. 1, FIG. 2 shows O-rings 31 and 32 comprising elastic bodies and installed between the spacer 14 and the outer rings 20a and 21a of the bearings 20 and 21 in such a way as to be slightly compressed. After the top roller T has been assembled, the O-rings 31 and 32 fill the gap between the spacer 14 and the outer rings 20a and 21a of the bearings 20 and 21, thereby preventing the loosening of the roller cylinder 12 externally installed on the outer rings 20a and 21a and the spacer 14. This configuration prevents vibration despite the rotation of the roller cylinder 12 at a high speed, thereby enabling uniform drafting at a high speed.

The elastic member installed between the inner rings 20b and 21b of the bearings 20 and 21 may comprise rubber instead of the spring. Although not shown, for example, a configuration is possible in which O-rings are disposed at both ends of the spacer.

The embodiments of this invention may be altered or adapted as appropriate.

According to this invention, when the roller cylinder is installed during the assembly of the top roller, even if it collides against the bearing, then the bearing is prevented from being damaged.

By applying an axial pressure to the outer rings of the bearings using an elastic body such as an O-ring provided between the outer rings, both the inner and outer rings of the bearings can be prevented from loosening. Thus, uniform drafting can be executed at a high speed.

I claim:

1. A top roller for a draft apparatus for drawing a sliver comprising: a shaft, a roller cylinder, a set of axially spaced bearings having inner and outer rings rotatably supporting said roller cylinder on said shaft, and an elastic member operative to press an inner ring of a bearing against a pressure-receiving section formed on said shaft.

2. A top roller for a draft apparatus according to claim 1 in which said elastic member is a spring.

3. A top roller for a draft apparatus according to claim 2 in which the inner ring of one of the bearings engages a pressure-receiving section formed at an end of said shaft, and the spring is installed between the inner rings of the bearings so as to press each of the bearings oppositely along a bearing surface of the shaft with the spring installed thereon.

4. A top roller for a draft apparatus according to claim 1 or claim 3 in which an axial pressure is applied to outer rings of said bearings to prevent them from loosening on said shaft.

5. A top roller for a draft apparatus according to claim 1 or claim 3 in which an O-ring applies an axial pressure to the outer ring of a bearing in order to prevent it from loosening on said shaft.

* * * * *